United States Patent
Komatsu

(10) Patent No.: US 7,908,996 B2
(45) Date of Patent: Mar. 22, 2011

(54) LIQUID COATING APPARATUS AND MAINTENANCE METHOD

(75) Inventor: Katsuaki Komatsu, Hachioji (JP)

(73) Assignee: Konica Minolta Holdings, Inc. (JP)

(*) Notice: Subject to any disclaimer, the term of this patent is extended or adjusted under 35 U.S.C. 154(b) by 996 days.

(21) Appl. No.: 11/706,670

(22) Filed: Feb. 15, 2007

(65) Prior Publication Data
US 2007/0193508 A1 Aug. 23, 2007

(30) Foreign Application Priority Data
Feb. 23, 2006 (JP) .................. 2006-046365

(51) Int. Cl.
*B05B 15/02* (2006.01)
*B05B 7/06* (2006.01)
*B05C 11/00* (2006.01)
*B41J 2/165* (2006.01)
*B41J 2/045* (2006.01)

(52) U.S. Cl. ........ 118/302; 118/313; 118/315; 118/602; 118/692; 118/663; 239/106; 347/22; 347/27; 347/68

(58) Field of Classification Search .................. 118/300, 118/302, 313–315, 692, 663, 665, 602; 347/22–33, 347/68, 19; 239/102.1, 104, 106
See application file for complete search history.

(56) References Cited

U.S. PATENT DOCUMENTS

| 4,549,191 | A  | * | 10/1985 | Fukuchi et al. ............... 347/71 |
| 6,533,397 | B2 | * | 3/2003  | Oishi ............................. 347/55 |
| 6,679,597 | B2 | * | 1/2004  | Ohsawa et al. ................. 347/95 |
| 2004/0155915 | A1 | * | 8/2004 | Kitami et al. .................. 347/10 |
| 2005/0128421 | A1 | * | 6/2005 | Oguchi et al. ............... 349/155 |
| 2005/0219323 | A1 | * | 10/2005 | Kusakari ....................... 347/55 |
| 2006/0152562 | A1 | * | 7/2006 | Ohishi .......................... 347/85 |

FOREIGN PATENT DOCUMENTS

JP 5-281562 10/1993
JP 2000-66215 3/2000

* cited by examiner

*Primary Examiner* — Yewebdar T Tadesse
(74) *Attorney, Agent, or Firm* — Cantor Colburn LLP

(57) ABSTRACT

A liquid coating apparatus, including; a head which has plural nozzles which eject liquid in which plural particles are dispersed, plural pressuring chambers each communicates to each nozzle, a piezo element which is provided on the pressuring chamber to change a volume of the pressuring chamber, and a common liquid chamber which communicates to each of the plural pressuring chambers; a sub-tank which stores the liquid and has an acceleration device to accelerate the plural particles to disperse in the liquid; a first flow channel which connects the common liquid chamber with the sub-tank; a second flow channel which connects the common liquid chamber with the sub-tank; and a circulation device which circulates the liquid through a circulation flow channel which includes the common liquid chamber, the first flow channel, the sub-tank and the second flow channel.

5 Claims, 9 Drawing Sheets

LIQUID COATING APPARATUS AND MAINTENANCE METHOD

This application is based on Japanese Patent Application No. JP2006-046365 filed on Feb. 23, 2006, with the Japanese Patent Office, the entire content of which is hereby incorporated by reference.

TECHNICAL FIELD

The present invention relates to a liquid coating apparatus and the maintenance method.

BACKGROUND

Liquid crystal displays use an electrical field to display the images by adjusting the light transmittance of the liquid crystals. That is, the liquid crystal displays use the electrical field which is formed between a picture electrode and a common electrode, which face an upper and lower substrates, and drive the liquid crystals.

Liquid crystal displays include a thin film transistor array substrate (being the lower substrate), a color filter array base (being the upper substrate), spacers (hereinafter, referred to as spacer particles) which retain cell gaps between the above substrates, and liquid crystals which fill the cell gap.

The thin film transistor array substrate is structured of a large number of signal wiring lines and thin film transistors, and an alignment layer which is placed on the above members for the liquid crystal orientation. The color filter array substrate is structured of a color filter for color reproduction, a black matrix to prevent light leakage, and the alignment layer coated onto the above for liquid crystal orientation.

Conventionally, the above described spacer particles were sprayed onto the substrate by a spacer particles spraying device, which was known as a spray method.

However, by such spray method, the spacer particles tended to be spread unevenly. Specifically, if any aggregation of the spacer in the displayed element is distinctly observed, it deteriorates the quality level of the liquid crystal display, which is of course a major problem. Further, in the case that a substrate incorporating an active element, such as TFT, if any spacer exists on a projected TFT, and if force is applied to the substrate, the TFT tends to be damaged, which was also a major problem.

Due to this, it is desired that a section is designated for placement of the spacer particles to keep them away from TFT, or the spacer particles are placed on a light shielding film. To resolve this, it is proposed that the spacer particles are arranged by a printing method, or that the spacer particles are arranged at specified locations by a special dispenser or an inkjet apparatus.

Among these methods, the inkjet apparatus can arrange spacer particles one by one at accurate locations, and an inkjet head having plural nozzles can arrange a large number of these spacer particles at the specific locations at the same time, which results in high productivity.

However, in this inkjet apparatus for ejecting the above spacer particles, a solvent, including large sized spacer particles whose diameter is several µm for example, is ejected for arranging the spacer particles, and which absolutely differs from the normal use of the inkjet apparatus which ejects colored liquid ink. Due to this, it is very essential that the spacer particles are evenly mixed in the jetting liquid supplied to the inkjet heads. Further, it is also essential that the spacer particles exist uniformly in the ejection head.

If the spacer particles exist unevenly in the ejecting liquid, ejection tends to become unstable or to malfunction, further the number of the spacer particles in the ejecting liquid changes due to the change of density, which result in major problems of the ejection characteristics. Accordingly, in a tank which supplies the ejecting liquid, being the solvent including the spacer particles, a mixing operation is necessary to uniformly disperse the spacer particles in the solvent.

For this purpose, an apparatus is known which simultaneously supplies the liquid crystals and the spacer particles. In this apparatus, a mixing device, having a motor driven screw, is provided in the tank in which the spacer particles are evenly dispersed in the liquid crystals (see Patent Document 1).

Further, a method is disclosed in which a pressuring chamber is vibrated by a piezo element to evenly disperse the spacer particles (see Patent Document 2).

[Patent Document 1] Unexamined Japanese Patent Application Publication No. 5-281,562

[Patent Document 2] Unexamined Japanese Patent Application Publication No. 2000-66,215

SUMMARY

Regarding the liquid in which particles having a relatively large diameter are included, that is, the liquid in which the spacer particles for the liquid crystal panel are included, the sedimentation rate is very high. In the above conventional art, since sedimentation and aggregation occur specifically in the head and near the nozzles, ejection can not be stably nor precisely controlled, which is a major problem.

An object of the present invention is to propose a liquid coating apparatus and its maintenance method, by preventing the spacer particles from settling out in the tank and aggregating to each other in the liquid, and further by preventing the malfunction of the liquid ejection and the change of density.

The above described object can be attained by the structures described below.

Structure 1.

In a liquid coating apparatus, including:
a head which includes
plural nozzles which eject liquid in which particles are dispersed;
plural pressuring chambers, each communicating to each of the plural nozzles;
a piezo element which is provided for each pressuring chamber to change the volume of the pressuring chamber; and
a common liquid chamber which communicates to each of the plural pressuring chambers;
a sub-tank tank which stores the liquid and has a device to accelerate the particles to disperse in the liquid;
a first flow channel which connects the common liquid chamber with the sub-tank; and
a second flow chamber which connects the common liquid chamber with the sub-tank;
the liquid coating apparatus is characterized in that the liquid coating apparatus is provided with a device which circulates the liquid in a circulation flow channel which includes the common liquid chamber, the first flow chamber, the sub-tank and the second flow chamber.

Structure 2.

A maintenance method of the liquid coating apparatus of Structure 1, including the steps of:
halting the circulation of the liquid in the circulation flow channel while the nozzles eject the liquid for coating; and circulating the liquid in the circulation flow channel while the nozzles do not eject the liquid for coating.

BRIEF DESCRIPTION OF THE DRAWINGS

FIG. 3(a) is a plane view of the thin film transistor array substrate, while FIG. 3(b) is a sectional view of the thin film transistor array substrate, taken along line III-III' of FIG. 3(a).

DESCRIPTION OF THE PREFERRED EMBODIMENTS

Figure 1:
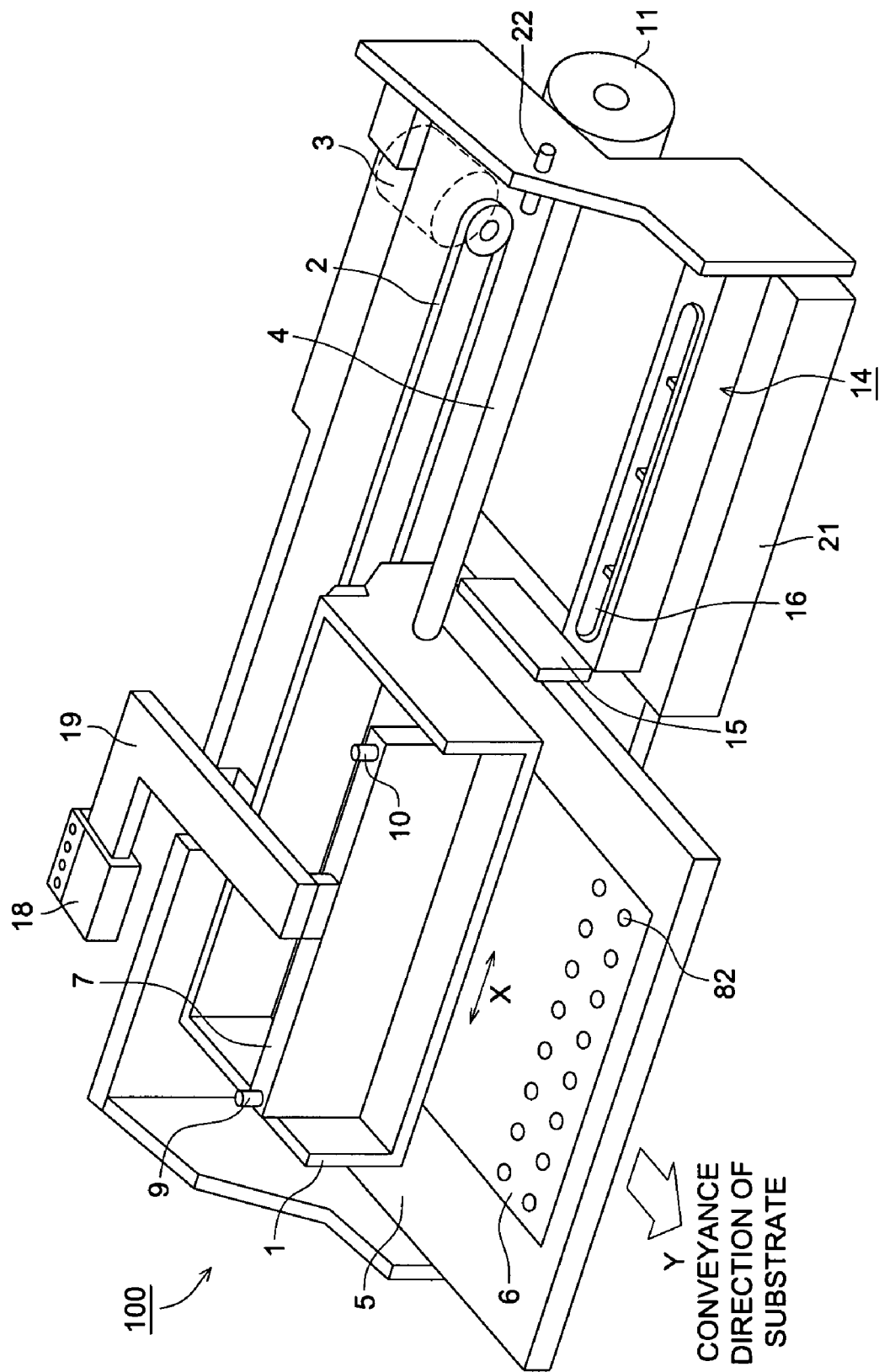
FIG. 1 is a perspective view of liquid coating apparatus 100, showing its major sections.

The embodiment of the present invention will now be detailed while referring to the drawings. The descriptions in this specification are not to limit the technical scopes of the claims nor the meaning of the terms. Further, the basic explanation of the embodiment of the present invention shows the best mode, but are not to limit the meaning of the terms nor the technical scope of the present invention.

[Liquid Coating Apparatus]

Figure 2:
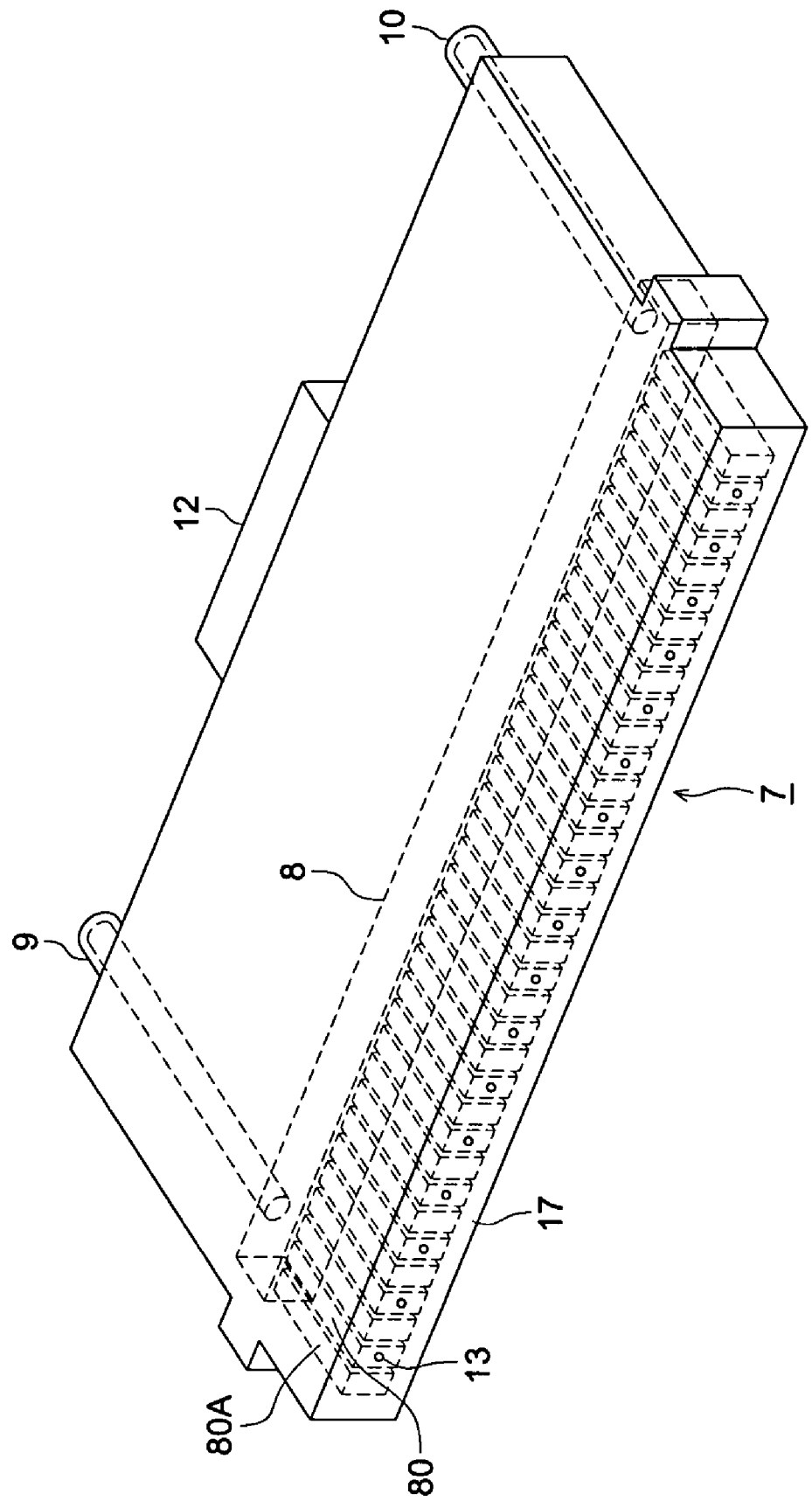
FIG. 2 is a perspective view of head 7 of liquid coating apparatus 100.

Liquid coating apparatus 100 will be detailed while referring to FIG. 1 and FIG. 2. FIG. 2 is a schematic view of the head, in which the electrodes are not illustrated.

In liquid coating apparatus 100 shown in FIG. 1, carriage 1, connected to a part of timing belt 2, is driven by carriage motor 3, and reciprocates along platen 5 as shown by arrows X, while supported by guide member 4.

Head 7 ejects the liquid in which spacer particles are dispersed, and has plural nozzles 13, see FIG. 2, to eject the liquid, which are formed perpendicular to the driving direction of thin film transistor array substrate 6. Head 7 is integral with carriage 1.

Plural box-shaped pressuring chambers 80, in FIG. 2, which are compartmented by partitions of the piezo elements, and plural air chamber 80A are alternately arranged in head 7. Each end of pressuring chambers 80 is communicated to common liquid chamber 8 to allow liquid flow. Each other end of pressuring chambers 80 is communicated to plural nozzles 13 which are formed on nozzle surface 17. Pressure is applied to the liquid by the piezo elements in each pressuring chamber 80, and the liquid is ejected from each nozzle 13. One end of each air chamber 80A is not communicated to common liquid chamber 8 so that the liquid can not flow into air chamber 80A. Nozzles 13 on nozzle surface 17 are not formed on the other end of each air chamber 80A.

Regarding the flow channel, the pressuring chamber, into which the liquid is supplied, and the air chamber, into which no liquid is supplied, are mounted alternately in the present embodiment. However it is also possible to form the flow channel of pressuring chambers without an air chamber. In the former case, even when the partition of the pressuring chamber is deformed due to shear, it does not affect the adjacent pressuring chambers, and the partition can be more easily driven.

In the present embodiment, in order to eject large sized spacer particles, which are solid materials, the head is driven by the piezo element.

Liquid inlet and outlet sections are provided on common liquid chamber 8. The liquid inlet section is communicated to first connecting section 9, and the liquid outlet section is communicated to second connecting section 10, whereby common liquid chamber 8 is formed to serve as a portion of the liquid flow channel.

A large number of nozzles 13 to eject the liquid are mounted to face platen 5, and coat the liquid onto thin film transistor array substrate 5, placed on XYθ stage 5. During the circulation of the liquid, the liquid flows in the direction as shown by the arrows in FIG. 4. The liquid is supplied to head 7 from first connecting section 9, and is returned from common chamber 8, in head 7, to sub-tank 40 (see FIG. 4) via second connecting section 10.

Thin film transistor array substrate 6 is conveyed with XYθ stage 5 in direction Y as shown in FIG. 1 by conveyance motor 11.

In FIG. 1, capping section 14, which covers nozzle surface 17 of head 7, is mounted outside the conveyance area of substrate 6. Further, capping section 14 functions as a liquid collecting means which collects the liquid ejected from head 7.

Cleaning section 15 comes into contact with nozzle surface 17 of head 7 to clean nozzles 13, during the reciprocating movement of carriage 1. Cleaning section 15 is mounted outside the conveyance area of substrate 6, in the same way as capping section 14, but is closer to the conveyance area of substrate 6 than capping section 14.

Control section 18 includes a CPU (central processing unit) and a working memory, which controls various movements of liquid coating apparatus 100, such as activation of the conveyance motor, movement of head 7, ejection of the liquid from head 7, and capping action of capping section 14. Control section 18 further controls the liquid circulation relating to the present invention. In addition, control section 18 includes driving signal generating section 500 (see FIG. 5) which has circuits to generate ejection pulses and micro-vibration pulses, which will be detailed later.

Cable 19 serves as an electrical connection between connector 12, of head 7, and control section 18.

Waste liquid tank 21 stores the liquid which is preliminarily ejected from head 7 and collected by capping section 14.

Home position sensor 22, being a photoelectric sensor, detects the standby position of carriage 1 by detecting the side of carriage 1, that is, it detects the capped position at which nozzle surface 17 of head 7 is covered by capping section 14.

When liquid coating apparatus 100 starts operation, based on control signals indicating the start of the coating operation sent from control section 18, head 7 standing-by at the capped position moves to the start position of the coating area and then stops. Next, control section 18 applies electrical signals based on ejecting data onto piezo elements of head 7, and head 7 ejects the liquid including the spacer particles from appropriate nozzles, whereby thin film transistor array substrate 6, placed on XYθ stage 5, is coated with the liquid.

Substrate 6 is conveyed in direction Y in accordance with the ejection of the liquid from head 7, and the above coating operation is advanced until the predetermined ejecting data are completely processed.

To be more precise, the liquid, in which spacer particles 82 are dispersed, are ejected onto a predetermined area [see FIGS. 3(a) and 3(b)], which will be detailed later, after which the solvent evaporates, and spacer particles 82 remain on the predetermined area.

[The Liquid in which the Spacer Particles are Dispersed]

Regarding spacer particles 82 which are used in the present embodiment, the spacer particles are of a diameter which can be ejected from the nozzles of head 7. The diameter of the spacer particles depends upon intended use, in the case of the liquid crystal display elements, the diameter is determined in accord with the thickness of the liquid crystal layer (thickness of the cells) which is inserted in the liquid crystal display apparatus, which diameter is approximately 4-6 µm. The diameter in this case is defined as volume average particle diameter. The diameter of each nozzle 13, of head 7, is 20-30 µm, which is 5-8 times of the diameter of a spacer particle. It is larger than the diameter of pigment particles of the ink, which is 0.1 µm. The volume average particle diameter can be measured by Particle Size Distribution Analyzer LA-920, manufactured by HORIBA, Ltd., or Multisizer 3 COULTER COUNTER, manufactured by Beckman Coulter, Inc.

Further, spacer particles 82 can be formed as spherical shape members of resins, such as silica dioxide or polystyrene.

Several kinds of liquid are usable as long as they can be ejected from the nozzles of head 7, and typically a volatile organic solvent or watered solvent, or a blend of the same are used. The ratio of the spacer particles and the solvent can be appropriately determined as long as they can be ejected from the nozzle of head 7. A lower density of spacer particles are more preferable, however at least one spacer particle must be included in one solvent droplet, therefore, the spacer particle is to be one volume %, and less than 20 volume % of each droplet. For example, the volume ratio of a 15-pico liter droplet and the spherical spacer particle at a diameter of 4 µm is 434:1, that is, in the case of one volume %, an average of four spherical spacer particles are contained in one droplet.

In the present embodiment, a liquid in which the spacer particles are evenly dispersed is prepared, that is, spacer particles 82 are evenly dispersed to be a predetermined density via ultrasonic waves, in a single component solvent or a blended solvent including more than two solvents, chosen from water, isopropyl alcohol and ethanol.

[The Distribution of Spacer Particles on the Substrate]

Figure 3:
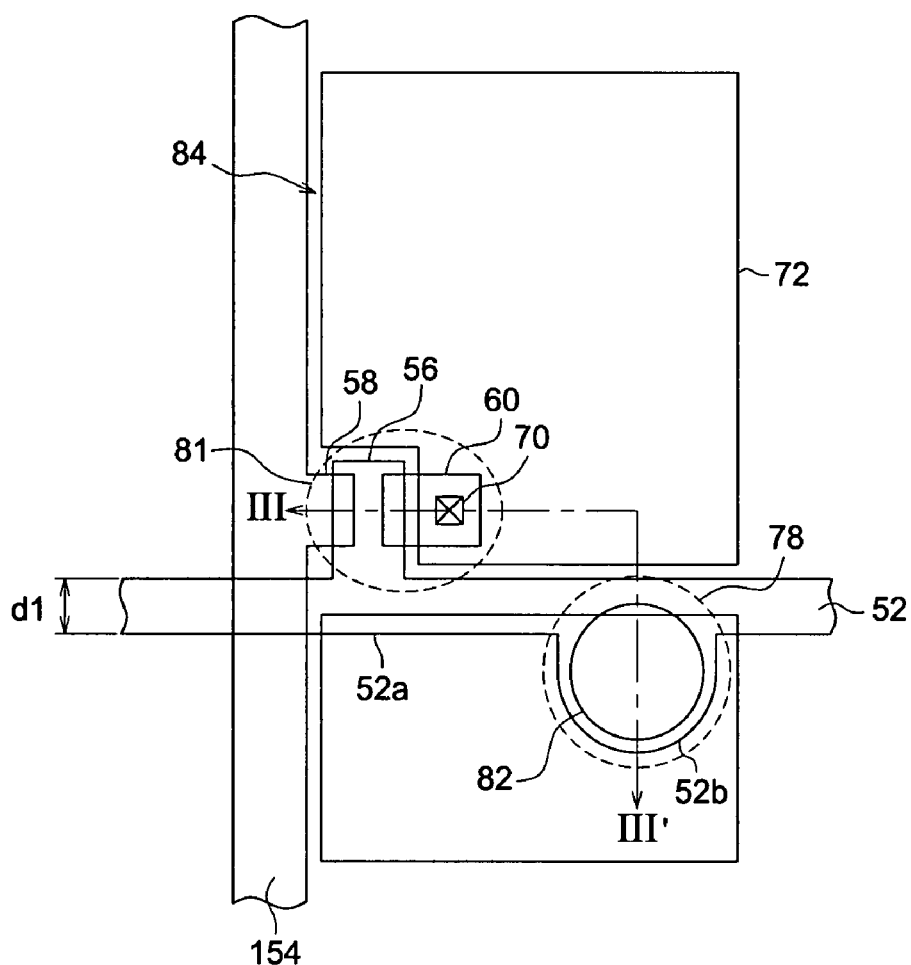
Figure 3:
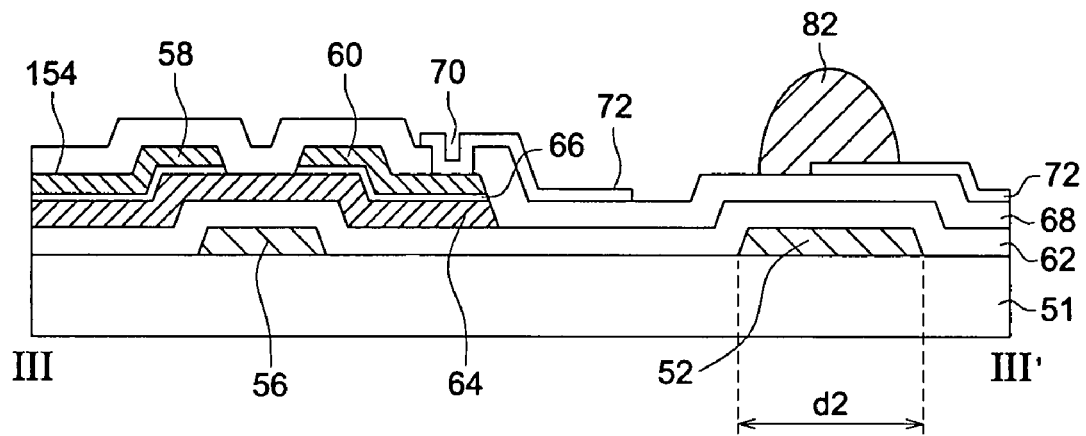

FIG. 3(a) is a plane view of thin film transistor array substrate 6 relating to this embodiment, while FIG. 3(b) is a sectional view of the thin film transistor array substrate, taken along line III-III' of FIG. 3(a).

While referring to FIGS. 3(a) and 3(b), thin film transistor array substrate 6 is structured of gate line 52 whose width varies and which is formed on lower substrate 51, data line 154 which crosses over gate line 52 via insulating film 62, thin film transistor 81 formed at each cross section, picture electrode 72 formed on picture element area 84, provided on the cross section, storage capacitor 78 which is formed on a superposed section of picture electrode 72 and gate line 52 and spacer particles 82 which is formed to be superposed on gate line 52.

Gate line 52 supplies gate signals to gate electrodes 56 of thin film transistor 81. Gate line 52 is structured of line section 52a to define picture element area 84, and of projecting section 52b which projects from line section 52a. Line section 52a is formed to have width d1, which prevents the open area ratio of picture electrode 72 from being reduced by projecting section 52b. Width d2 of projecting section 52b is formed to be greater than that of line section 52a, in an area in which spacer particles 82 are ejected by liquid coating apparatus 100. For example, the width which is parallel to data line 154 of projecting section 52b, is formed to be approximately 30-50 µm, while the width which is perpendicular to data line 154, is approximately 30-50 µm. Projecting section 52b, formed to be a round shape is wider than round spacer particles 82.

Spacer particles 82 support the cell gap between thin film transistor array substrate 6 and the color filter array substrate. For this purpose, via liquid coating apparatus 100, spacer particles 82 are formed on the projecting area of gate line 52 which is superposed with a black matrix (which is not illustrated) of the color matrix array substrate. That is, spacer particles 82 are formed to superpose with storage capacitor 78.

Accordingly, spacer particles 82 are not placed on transparent liquid crystal electrode, but are placed on non-transparent gate line 52, which is preferable, because the picture quality is not deteriorated.

[Liquid Supplying System]

Figure 4:
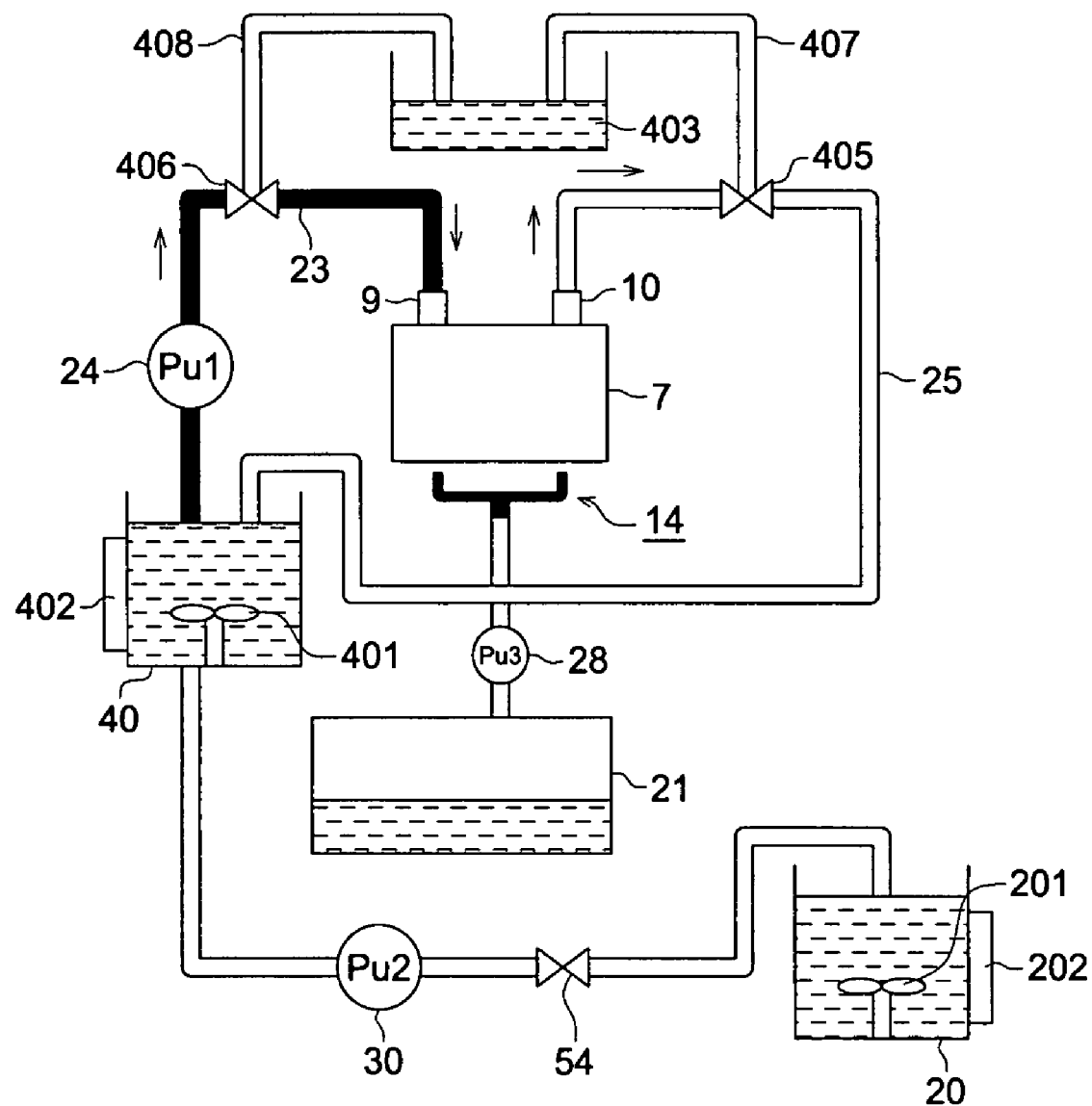
FIG. 4 shows the liquid supplying system of liquid coating apparatus 100 of the present invention.

The embodiments of the first flow channel and the second flow channel will now be detailed, while referring to FIG. 4, which is a schematic drawing to show the embodiment of the liquid supplying system to be used for liquid coating apparatus 100 of the present invention. First flow channel 23 and second flow channel 25 are blocked off from the air, and the liquid to be used is one in which spacer particles 82 are dispersed. First flow channel 23 is from sub-tank 40 to first connecting section 9, while second flow channel 25 is from second connecting section 10 to sub-tank 40.

Sub-tank 40 has a vent to the air, and stores the liquid in which spacer particles 82 are dispersed, the liquid is fed through the liquid flow channels.

Sub-tank 40 is provided to stabilize the liquid back-pressure between liquid tank 20 and first connecting section 9 of head 7. Valve 54, and pump 30 which feeds the liquid by the pressure from liquid tank 20 to sub-tank 40, are provided between liquid tank 20 and sub-tank 40.

Pump 24 is provided in first flow channel 23, which is from sub-tank 40 to first connecting section 9 of head 7, to send the liquid during circulation of the liquid. Pump 24 serves as a circulating device of the liquid, as well as a pressurized delivery device of the liquid to head 7. That is, sub-tank 40, first flow channel 23 and pump 24 work together to serve as the liquid supplying devices. In addition, pump 24 is deactivated while nozzles 13 eject the liquid to coat substrate 6, as well as not circulating any liquid in first flow channel 23. Even when pump 24 is deactivated, the liquid can flow through pump 24 in first flow channel 23.

The liquid returns from second liquid connecting section 10 to sub-tank 40 through second flow channel 25.

Suction pump 28 is provided on the way of the flow channel between capping section 14 and waste liquid tank 21. Suction pump 28 aspirates the liquid in capping section 14 or nozzles 13 of head 7, and feeds the same to waste liquid tank 21.

Flow channels of pump 24 and suction pump 28 are structured of flexible members. Pressure applying members, such as plural rollers, nip to press the flow channels, being tubes, in longer direction from a top to an end of the tubes, whereby the liquid is pumped. Various well-known pumps are usable.

In FIG. 4, agitation screw 201 is provided in liquid tank 20, agitation screw 401 is also provided in sub-tank 40, while piezo element 202 is provided on liquid tank 20 to generate ultrasonic vibration, as is piezo element 402 on sub-tank 40 to generate ultrasonic vibration. Agitation screws 201 and 401, as well as piezo elements 202 and 402 are acceleration devices for accelerating the dispersion of the spacer particles in the liquid.

Since agitation screws 201 and 401 are always rotated by motors at relatively high speed in each tank, independently of the liquid ejection from head 7, the liquids stored in liquid tank 20 and sub-tank 40 are appropriately agitated by shear stress so that spacer particles 82 are prevented from aggregating or settling.

Further, since piezo element 202 is mounted on liquid tank 20, as is piezo element 402 on sub-tank 40, the liquid stored in each tank is vibrated via ultrasonic waves, which prevents aggregation of spacer particles 82. The piezo elements, serving as ultrasonic generators used in each tank, are not special ones, and may be any of well-known ultrasonic generators.

In addition, though the shear stress by the screw and the ultrasonic waves are applied to the liquid for agitation, it is also effective when only one of them is used, and specifically the ultrasonic waves are more effective.

Agitation screw 401 and piezo element 402 are an example of the means for accelerating the dispersion of spacer particles 82 in the present invention. Even when spacer particles 82 in the liquid have been initially unevenly dispersed, since the shear stress and the ultrasonic wave are applied to the liquid in sub-tank 40, spacer particles 82 are again dispersed evenly in the liquid, which are supplied to head 7, resulting in appropriate liquid ejection onto and coating of the substrate.

To effectively disperse the spacer particles in the liquid, shear stress is effective as described above, that is, a rotating member, such as the screw generally used in dispersion equipment, is preferable to use for this purpose.

Further, since the system for circulating the liquid is formed in the flow channels including common liquid chamber 8 for head 7, first flow channel 23, sub-tank 40 and second flow channel 25, even when the liquid is not ejected from nozzles 13 onto substrate 6, the liquid is circulated through head 7, which results in the continual effective dispersion of the spacer particles in the flowing liquid. Due to this, sedimentation and aggregation of spacer particles 82 dispersed in the liquid are effectively prevented, as well as malfunctions of liquid ejection and density change, whereby the liquid can be stably and accurately ejected from the head.

Accordingly, during ejection or not of the liquid from head 7, the liquid is always stressed for even dispersion, which allows dispersion of the spacer particles to always be the same condition.

Concerning the agitation conducted by the ultrasonic waves, as the typical example, the piezo element is mounted directly to the tank, and is driven by the electric voltage wave-form of the predetermined frequency to generate the ultrasonic waves. The ultrasonic generator, rather than the above example, can also be used.

Specifically the continual agitation via ultrasonic waves prevents the spacer particles from settling out in the tank and rising to the liquid's surface, to be evenly dispersed in the liquid, and further, prevents the spacer particles from aggregating with each other or attaching to the surfaces of the tank.

Next, liquid coating apparatus 100 is provided with preservation liquid tank 403, in which liquid excluding spacer particles are stored, because the spacer particles tend to aggregate with each other, and such liquid is hereinafter referred to as preservation liquid. Head 7 is connected to sub-tank 40 via liquid flow channels 23 and 25, so that the liquid is supplied to head 7 from sub-tank 40. After ejecting operation of liquid coating apparatus 100 is stopped, changeover valves 405 and 406 are switched to allow preservation liquid flow in channels 407 and 408, then capping section 14 covers nozzle surfaces 17 of head 7 to reduce the pressure inside capping section 14 via suction pump 28. Due to these actions, the preservation liquid is sent from preservation liquid tank 403 to head 7, into which the liquid has been filled, via channels 407 and 408. Accordingly, the liquid including the spacer particles in head 7 is entirely replaced with preservation liquid which does not include spacer particles. The waste liquid generated by this change-over operation is stored in waste tank 21 via suction pump 28.

When liquid coating apparatus 100 is activated, changeover valves 405 and 406 are switched to open first flow channel 23 and second flow channel 25, and capping section 14 covers nozzle surfaces 17 of head 7 to reduce the pressure inside capping section 14 by suction pump 28. Due to these actions, the liquid including the spacer particles are sent from sub-tank 402 to head 7, which had been filled with the preservation liquid, via first flow channel 23. Accordingly, the liquid, excluding the spacer particles, in head 7 is entirely replaced with liquid including the spacer particles. The waste liquid generated by this change-over operation is also stored in waste tank 21 via suction pump 28.

Liquid replacement is not limited to the above method, but any method will be used which can entirely replace the previous liquid, including the spacer particles filling head 7, with preservation liquid. By this liquid change-over operation, the spacer particles are prevented from settling out or segregating in the head while the stand-by status of liquid coating apparatus 100.

Concerning the preservation liquid, the solvent which largely constitutes the liquid to disperse the spacer particles, or any compound comparable to the solvent, is preferable for use. Accordingly, though the preservation liquid is mixed in the coating liquid, the spacer particles are prevented from settling out or aggregating with each other.

[Head Driving Method]

Figure 5A:
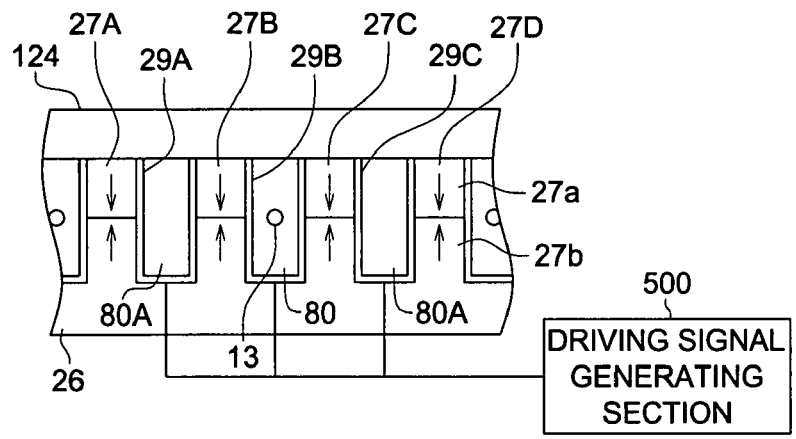
FIGS. 5(a)-5(c) are sectional views to show the liquid ejecting operations of the head.
Figure 5B:
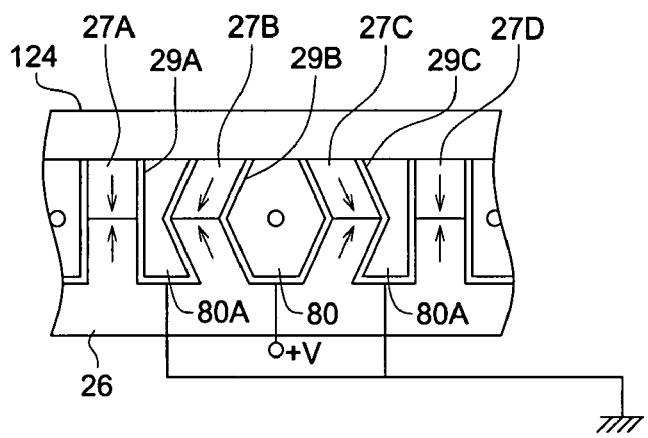
Figure 5C:
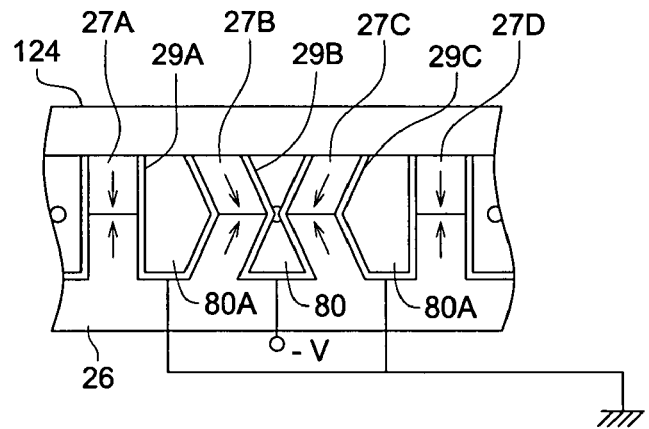

FIGS. 5(a), 5(b), and 5(c) are sectional drawings of head 7 shown in FIG. 2. FIG. 5(a) shows that pressuring chamber 80 is in a neutral condition, FIG. 5(b) shows expanded pressuring chamber 80, while in FIG. 5(c), pressuring chamber 80 is contracted. Head 7 is structured of nozzles 13, covering plate 124, base 26 and walls 27A, 27B, 27C, 27D, - - - . Pressuring chambers 80 and air chambers 80A are structured of walls 27A, 27B, 27C and 27D, cover plate 124 and base 26.

In this case, head 7 is a shear-mode type head in which the pressuring chambers and the air chambers are alternately mounted, each is separated by walls 27A, 27B, 27C and 27D which are the piezo elements serving as electrical/mechanical changing devices. In FIG. 5, three pressuring chambers and three air chambers among a large numbers of both chambers are illustrated. One kind of top (hereinafter referred to as a nozzle side top) of pressuring chamber 80 is connected to nozzle 13 which is formed on the nozzle forming member, while another kind of top (hereinafter referred to as a manifold top) is connected to common liquid chamber 8. From the top of walls 27A, 27B, 27C and 27D to the bottom of base 26, electrodes 29A, 29B and 29C are formed to be in contact with walls 27A, 27B, 27C and 27D of each pressuring chamber 80 and air chamber 80A. Electrodes 29A, 29B and 29C are connected to driving signal generating section 500.

The surface of each electrode which comes into contact with the liquid is covered with an insulating film, for which polyparaxylene is available.

Driving signal generating section 500 outputs micro-vibration pulses and ejection pulses.

Each wall is structured of two piezo members 27a and 27b, whose polarized direction is opposite each other, as shown in FIGS. 5(a), 5(b), and 5(c). Only a single piezo member 27a in FIG. 5(a) may be used instead of two such members, or the piezo member may be attached to at least a portion of the wall.

When the liquid ejection pulses are applied to electrodes 29A, 29B and 29C, contacted to each wall, via driving signal generating section 500, the liquid including the dispersed spacer particles in pressuring chamber 80 is ejected from nozzle 13 as liquid droplets, which will be further detailed below.

Firstly, when the ejection pulse is not applied to any one of electrodes 29A, 29B and 29C, no change occurs on walls 27A, 27B and 27C. Under the condition shown in FIG. 5(a), when electrode 29B is activated by an ejection pulse, while electrodes 29A and 29C are grounded, electrical fields are generated perpendicular to the polarization direction of piezo elements attached to walls 27B and 27C, walls 27B and 27C are deviated from conjunction surfaces of walls 27a and 27b, that is, walls 27B and 27C are shifted in opposite directions from each other as shown in FIG. 5(b), and pressuring chamber 80 expands to generate negative pressure within it so that the liquid is drawn into pressuring chamber 80 (which is called a drawing operation).

When the ejection pulse returns to 0 volt, the configuration of pressuring chamber 80 returns to the neutral condition shown in FIG. 5(a) from expanded condition shown in FIG. 5(b), so that high pressure is applied to the liquid in pressuring chamber 80 (which is called a releasing operation). Next, as shown in FIG. 5(c), ejection pulses are applied to walls 27B and 27C to shift them in opposite directions, that is, the volume of pressuring chamber 80 is reduced, whereby the positive pressure is generated in pressuring chamber 80 (which is called a reinforcing operation). Due to this, a liquid meniscus, which is the top portion of the liquid, coming from pressuring chamber 80, and generated in the nozzle, is shifted in direction to be ejected from the nozzle. When the positive pressure grows up until it is enough to eject the droplet from the nozzle, the droplet is ejected. The other pressuring chambers also operate in the same way. Such an ejection method is called a DDR (being draw-release-reinforce) driving method, which is a typical driving method of the shear-mode type inkjet head.

Figure 6:
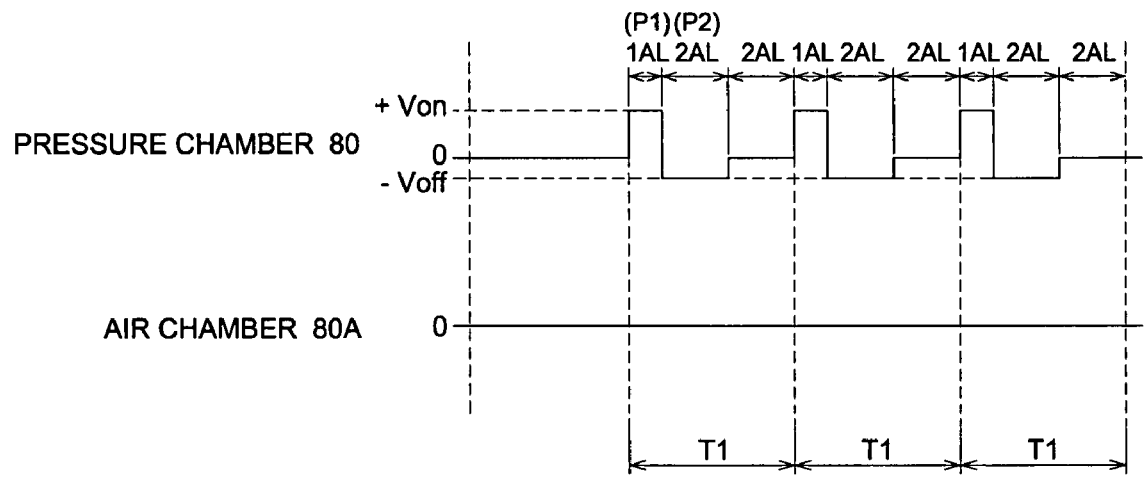
FIG. 6 is a timing chart of the pulse waves which are applied to pressuring chamber 80 and air chamber 80A, while the liquid is ejected.

The above ejection will be further detailed while referring to FIG. 6, which shows a timing chart of the pulse waves to be applied to pressuring chamber 80 and air chamber 80A.

To eject the liquid, the voltage is applied to the electrode of each pressuring chamber, while the electrodes of the air chambers existing at both sides of each pressuring chamber are grounded. For example, when the positive voltage during 1 AL period as an ejection pulse is applied to the air chamber, the walls of the pressuring chamber shift outward to generate the negative pressure in pressuring chamber 80. Via this negative pressure, the liquid is drawn into pressuring chamber 80 from sub-tank 40 (which is a drawing operation). Unit "AL" will be detailed later.

After this condition kept for 1 AL period, the pressure changes from negative to positive, and at this timing, the electrode is grounded to allow the walls to return to their original states so that the high pressure is applied to the liquid in pressuring chamber 80 (which is a releasing operation). Further, at the same timing, the negative voltage is applied to the pressuring chamber to shift the walls inward, so that the higher pressure is applied to the liquid (which is a reinforcing operation), to eject the droplet from the nozzle. Then, after 1 AL period, the pressure reverses to negative, changing pressuring chamber 80 to be negative. After 1 AL period, the pressure of pressuring chamber 80 returns to positive, and simultaneously the grounded electrode causes the walls to return to the original state, and any residual pressure waves are cancelled.

After a predetermined downtime (which is the 2 AL periods in this embodiment) has passed, the above procedure is repeated at ejecting frequency T1.

Additionally, "AL" (being acoustic length) means one half of an acoustic resonance frequency of the pressuring chamber. The AL is described below. A square waved voltage pulse is applied to walls 27, which is an electrical and mechanical liquid transfer means, and the velocity of an ejecting droplet is measured. When the pulse width of the square wave is changed, while the voltage of the square wave is kept constant, the AL is the pulse width at which the ejecting velocity of the droplet becomes maximized. In this case, the pulse means a square wave having a constant voltage. When 0 V is 0%, and the pulse height voltage is 100%, the pulse width in this case means an interval between a period at a rising up 10% from 0 V and a period at a falling down 10% from the pulse height voltage. Further, in this case, the square wave means the wave form in which both the rise duration between 10% to 90% and the fall duration between 90% to 10% are equal to or less than one half of AL, and more preferably, equal to or less than one fourth.

On the other hand, concerning head 7 which is a shear-mode type, the chamber walls are shifted and returned by the difference of voltages applied to the electrodes mounted on both sides of the wall. Further, it is also possible to operate the same function as the above via the method described below. That is, instead of applying the negative voltage to the electrode of the pressuring chamber to eject the droplets, the electrode of the pressuring chamber to eject the droplets is grounded, and a positive voltage is applied to the electrodes of the air chambers mounted on both sides of the pressuring chamber. Only a positive voltage can drive the walls in this method, which is preferable for the apparatus.

The ejection pulses, used in the present embodiment as shown in FIG. 6, include first pulse P1 which is a square wave and expands the volume of pressuring chamber 80, and after 1 AL later, which allows it to return to the original volume, and second pulse P2 which is a square wave and reduces the volume of pressuring chamber 80, and after a predetermined time, allows it to return to the original volume. Voltage $V_{on}$ of first pulse P1 is greater than voltage $V_{off}$ of second pulse P2. Setting voltage $V_{on}$ to be greater than voltage $V_{off}$ is more effective to supply the liquid into pressuring chamber 80 when the liquid of high viscosity is ejected.

Voltage ratio $V_{on}/V_{off}$ is preferably equal to or greater than 1.5. Because in the present embodiment, the voltage of micro-vibrating pulses for vibrating the nozzle, and which will be detailed later, is set to be the same as voltage $V_{off}$ of second pulse P2, and by setting voltage ratio $V_{on}/V_{off}$ to be equal to or greater than 1.5, the vibrating amount of the liquid meniscus in the nozzle caused by the micro-vibrating pulses can be more precisely controlled. Further, when the micro-vibrating pulses are applied just before or just after the ejection pulse, reverberation of the pressure wave generated by the ejection pulse and the reverberation of the pressure wave generated by the micro-vibrating pulses appropriately cancel each other, which realizes the stable ejection of the droplets. Specifically, when the liquid using the volatile solvent to disperse the spacer particles are employed, the dynamic viscosity while ejecting the droplets tends to be lower than the static viscosity, therefore voltage ratio $V_{on}/V_{off}$ can be regulated to be equal to or greater than 1.5, which is preferable to apply stable vibration to the meniscus.

If voltage ratio $V_{on}/V_{off}$ is established to be equal to or less than 1.0, the liquid meniscus in the nozzle vibrates greater, and the reverberation of the pressure wave after the application of the micro-vibrating pulses greatly affects the drive of the ejection pulse, which results in unstable jetting. On the other hand, if voltage ratio $V_{on}/V_{off}$ is established to be equal to or greater than 5.0, the liquid meniscus in the nozzle vibrates less, therefore, de-capping is not effectively conducted, which is not preferable.

Further, since the liquid includes the spacer particles in the present invention, significant effects can be realized. Since the liquid includes the volatile solvent and the spacer particles, the viscosity of the liquid increases rapidly due to the evaporation of the volatile solvent, but the micro-vibrating pulses are applied to the liquid meniscus, which effectively prevent the increase of the viscosity on the liquid meniscus in the nozzle.

Figure 7:
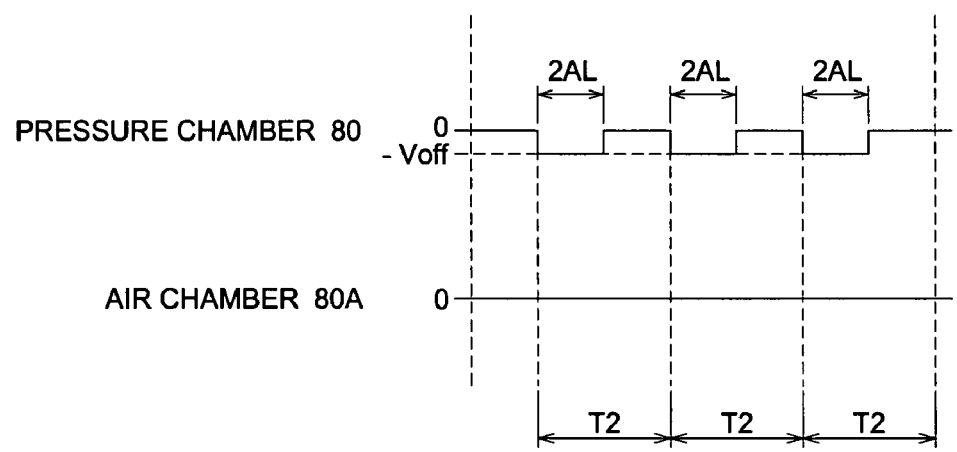
FIG. 7 is a timing chart of the pulse waves which are applied to pressuring chamber 80 and air chamber 80A, while the liquid meniscus in nozzle 13 is subjected to micro-vibration.

In the case of shear-mode type inkjet head 7, operation of applying the micro-vibration to the liquid meniscus will be detailed, while referring to FIG. 7.

In the present embodiment, the micro-vibrating pulses, which slightly vibrates the nozzle but does not allow the nozzle to eject any droplets, are generated by driving signal generating section 500 shown in FIG. 5, which is the same process as the case of applying the ejection pulses. The micro-vibrating pulse is structured of a square wave which allows the pressuring chamber to return to the original state after reduction of the volume of the pressuring chamber, and the micro-vibrating pulse includes the square wave of the pulse width of 2AL. Square waves can more effectively micro-vibrate the liquid meniscus than trapezoidal waves can. Further, the square waves micro-vibrate the liquid meniscus at a lower driving voltage than the trapezoidal waves. Driving circuit of the square waves can be designed by a simpler digital circuit, which is advantageous. In addition, since the square waves allow the pressuring chamber to return to the original state after the reduction of the volume of the pressuring chamber, they effectively apply the desired micro-vibration to the nozzle, without allowing the nozzle to eject the droplets.

In an example shown in FIG. 7, firstly at the home position, the electrode of each air chamber 80A is grounded, and the mocro-vibrating pulse, being a positive square waves of width 2 AL, is applied to the electrode of each pressuring chamber 80. Accordingly, the pressuring chamber returns to the original state after reduction of its volume, and thereby, the liquid meniscus in the nozzle receives the micro-vibration which can push on the liquid but not enough to eject the droplet from the nozzle.

After a predetermined downtime has passed, the micro-vibrating pulse is repeated at the driving frequency of T2.

When structuring the ejection pulse, the micro-vibrating pulse is set to be the same as voltage $V_{off}$ of second pulse P2. Since voltage $V_{off}$ is relatively low, the nozzle is not vibrated vigorously, and thereby, though the nozzle vibrates, the nozzle does not eject the droplets. Further, the ejection pulse and the micro-vibrating pulse are commonly generated by driving signal generating section 500, which can reduce the number of the power supplies, resulting in the cost reduction of the circuit.

In the present embodiment, since the micro-vibrating pulse is applied to the nozzle at the home position, the liquid existing at nozzle openings is effectively prevented from an increase in viscosity. Further, the micro-vibrating pulse is too small to eject a droplet from the nozzle, which is driven by the piezo element in the present specification. Via excitation of the piezo element, the pressure wave is generated in the pressuring chamber filled with the liquid, and the spacer particles, dispersed in the droplet in the pressuring chamber, are again evenly dispersed in the liquid, which effectively prevent the spacer particles from settling out in the nozzle or aggregating to each other.

Further, when the liquid is circulating, the micro-vibrating pulses apply the vibration to the circulating liquid, and the liquid stagnating at the corners of the common liquid chamber is appropriately circulated, and the circulation effectively prevents settling-out or aggregation of the spacer particles within the liquid. When the spacer particles aggregate to each other, they vary in size. Accordingly it is preferable to prevent such aggregation by sweeping the driving frequencies of the driving waveform of the micro-vibrating pulses, and sweeping is preferably conducted between 1 kHz to 1/AL Hz.

Figure 8:
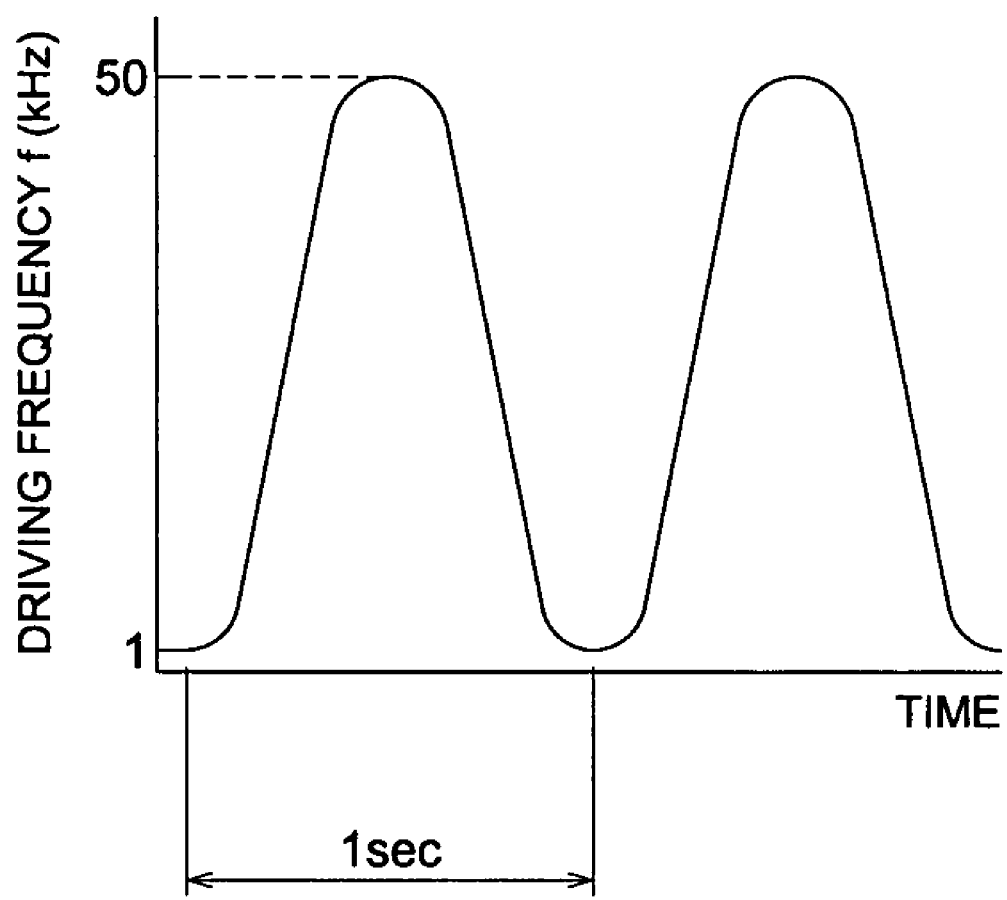
FIG. 8 is a timing chart of the driving frequency while the liquid meniscus in nozzle 13 is subjected to micro-vibration.

FIG. 8 shows an example in which sweeping of the driving frequencies is conducted between 1 kHz to 50 kHz by 1 second as one reciprocation cycle, and the abscissa axis represents the time, while the ordinate axis represents the driving frequency of the micro-vibrating pulses. AL of head 7 is 5 μsec, and 50 kHz correspond to 1/(4AL).

Based on the sizes of the spacer particles, the frequency of the mechanical vibration has various effects upon the dispersal and movement of the spacer particles. Therefore, the vibration during the sweep of the frequencies is more effective to disperse or move the varied size of spacer particles.

[Operational Flow of Liquid Coating Apparatus 100]

Figure 9:
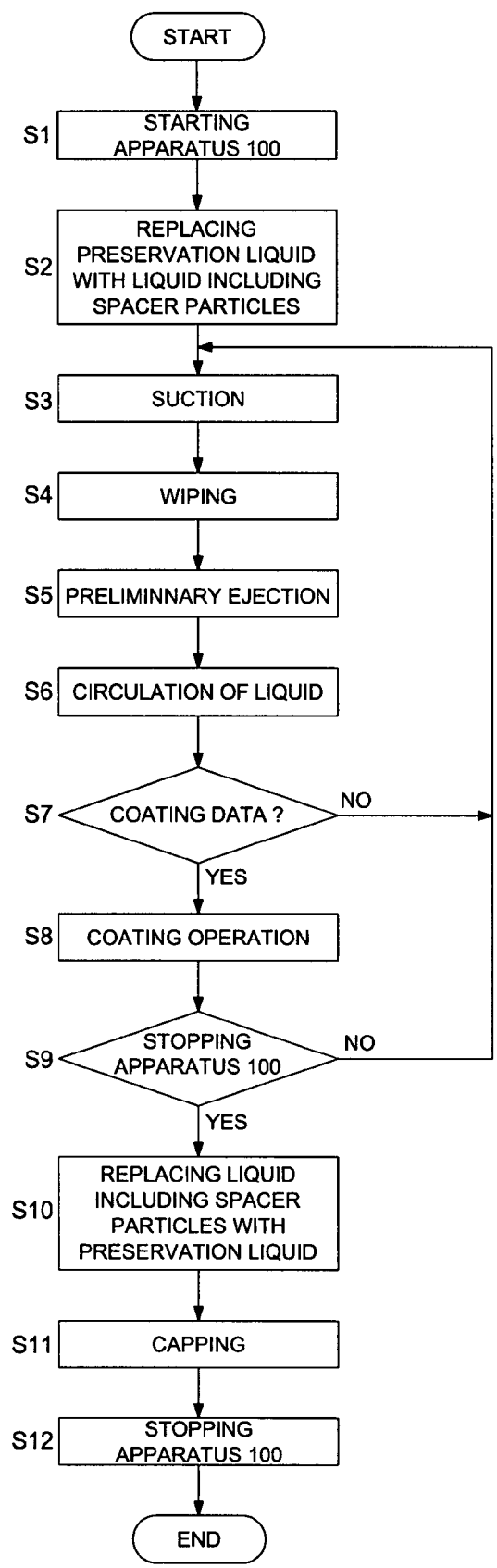
FIG. 9 is a flow chart which shows the operation of liquid coating apparatus 100.

The operational flow of liquid coating apparatus 100 will be detailed while referring to the flowchart of FIG. 9. As described above, the agitation screws of sub-tank 40 and liquid tank 20, and the piezo element are always activated independently to the operation and the stop of apparatus 100.

After apparatus 100 has not worked for a long interval, apparatus 100 is firstly switched on (step S1). At this timing, nozzle surface 17 of head 7 is securely covered with suction cap 16 by capping section 14, and changeover valves 405 and 406 are selected to allow flow of the liquid into preservation liquid flow channels 407 and 408.

Next, at the home position, the preservation liquid is replaced with liquid in which the spacer particles are dispersed (step S2). After replacement, changeover valves 405 and 406 are switched to allow flow of liquid into first and second flow channels 23 and 25. A purging operation is then conducted (step S3) in which all pressuring chambers are driven by the waveform shown in FIG. 6 while ejecting the liquid from the nozzles at the home position, and any residual liquid in the nozzles 13 is suctioned out. Next, capping section 14 is activated to release suction cap 16 from head 7, and cleaning section 15 wipes nozzle surface 17 (step S4). After which, capping section 14 is activated to securely cover nozzle surface 17 with suction cap 16, and all pressuring chambers are driven by the driving wave shown in FIG. 6 to preliminarily eject the liquid from each nozzle 13 into suction cap 16 (step S5). While all pressuring chambers are driven by frequency sweep of the waveforms shown in FIG. 7, pump 24 circulates the liquid (step S6).

The standby operations, during steps S3-S6 conducted at the home position, are continued until the coating data arrives. These standby operations are an example of the maintenance method relating to the present embodiment, which can be operated by an operator, or can be automatically started after a predetermined time has passed, which was established by a timer, serving as a time setting section, which is not illustrated.

Next, when the coating data arrives (yes in step S7), the standby operation stops, and carriage 1 is activated, and when head 7 enters the coating area, head 7 is activated by the driving waves shown in FIG. 6 to eject droplets from nozzles 13 onto substrate 6 based on the ejecting data, that is, coating is conducted (step S8). In addition, while carriage 1 runs toward the coating area from the home position, the spacer particles are prevented from settling out in the nozzle or aggregating to each other, due to the applied micro-vibration pulses.

After coating, carriage 1 returns to the home position, and checks whether apparatus 100 is to be stopped (step 9). If step S9 is "no", which means that apparatus 100 will not be stopped, and the sequence returns to step S3, and continues the standby operation until the coating data arrives.

If step S9 is "yes", which means that apparatus 100 will be stopped, and all liquid carrying dispersed spacer particles are replaced with preservation liquid (step 10). Capping section 14 securely covers nozzle surface 17 (step 11), and apparatus 100 stops operation (step 12).

As described above, while the liquid circulates, it is very important to cover nozzle surface 17 with suction cap 16. Due to this, though the flow rate is increased, air in a space enclosed by suction cap 16 counters the liquid pressure, and thereby the liquid meniscus in nozzle 13 is not destroyed, that is, no liquid transpires from nozzle 13. Suction cap 16 is formed of an elastic member, such as rubber. When suction cap 16 is pressed against nozzle surface 17, suction cap 16 is compressed, and the air pressure in the above-described enclosed space is increased slightly. Accordingly, even when flow rate of the liquid passing through the flow channel is further increased, the liquid meniscus in the nozzle is not destroyed.

Further while coating substrate 6, in order to protect the liquid meniscus, circulation of the liquid should not be conducted.

Still further, the piezo elements in whole pressuring chambers are activated to eject the liquid, and simultaneously the liquid in the nozzle is aspirated to conduct the purging operation, therefore, strong pressure waves are generated during the aspiration, which appropriately accelerates the movement of the spacer particles within the liquid.

Figure 10:
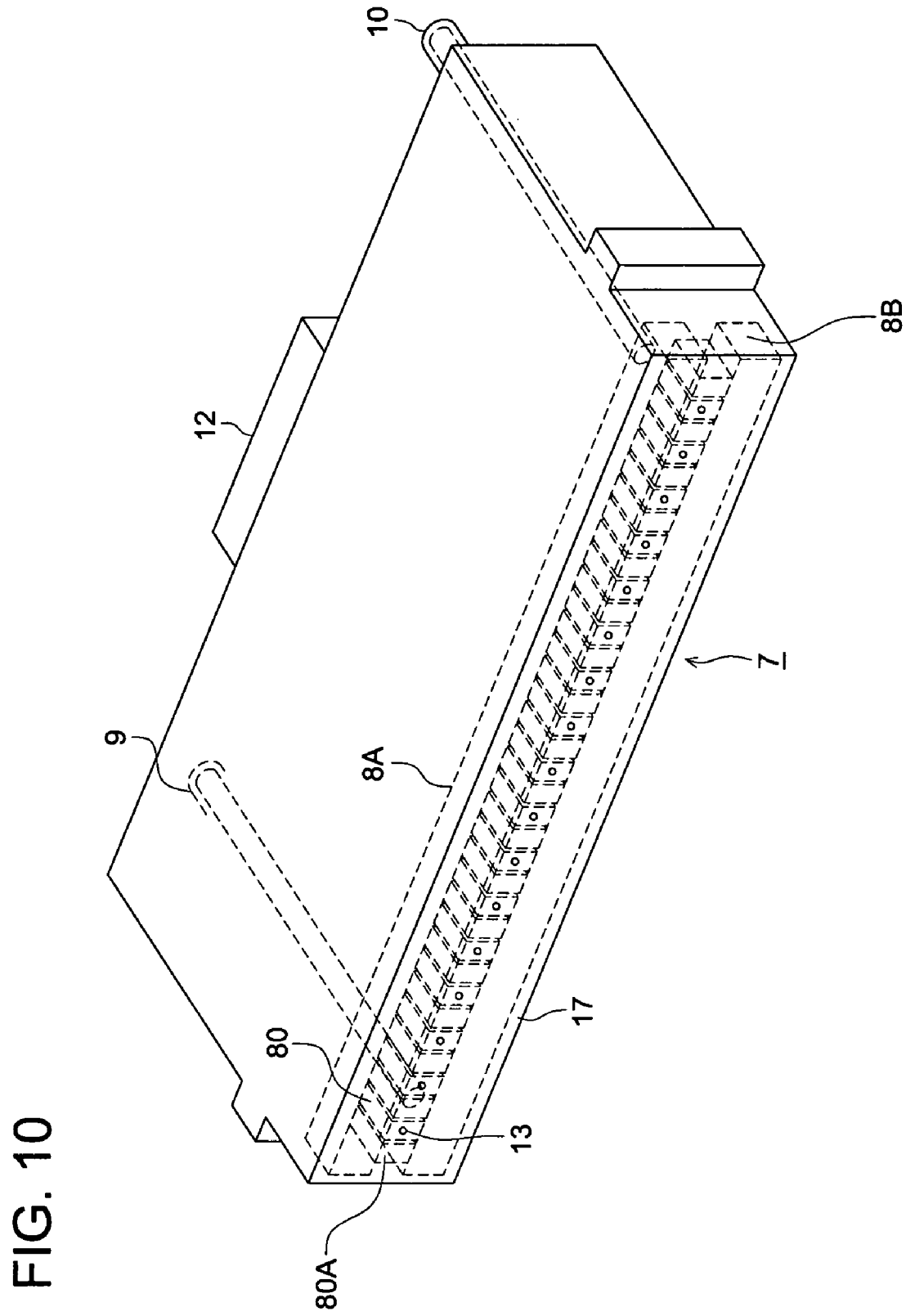
FIG. 10 is a perspective view of another embodiment of the head of liquid coating apparatus 100.

In the above descriptions, an edge-shooter type head which is shown in FIG. 2, is used for the explanation, however, the head is not limited to this type, and a side-shooter type head which is shown in FIG. 10 can also be used. The same numbers apply to sections and components in FIG. 10 which have the same function as those in FIG. 2, and redundant explanations are cancelled.

Plural box-shaped pressuring chambers 80, which are compartmented by piezo elements as the partitions, are formed in head 7 which is shown in FIG. 10. One end of each pressuring chamber 80 is communicated to common liquid chamber 8A, and the other end of each pressuring chamber 80 is communicated to common liquid chamber 8B to allow the liquid to flow in. The side surface of each pressuring chamber 80 is communicated to plural nozzles 13 which are formed on nozzle surface 17. The liquid is compressed by the piezo elements in pressuring chamber 80, and is ejected from nozzles 13.

A liquid inlet section is mounted on common liquid chamber 8B, while a liquid outlet section is mounted on common liquid chamber 8A. The liquid inlet section of common liquid chamber 8B is communicated to first connecting section 9, while the liquid outlet section of common liquid chamber 8A is communicated to second connecting section 10. Accordingly, common liquid chambers 8A and 8B, and each pressuring chamber 80 are structured as a portion of the liquid circulating channels. By these structures, the targeted effects of the present invention are enhanced.

The liquid is supplied to head 7 through first connecting section 9, and the liquid flows from common liquid chamber 8B and passes through pressuring chamber 80, common liquid chamber 8A, and second connecting section 10, to return to sub-tank 40.

Regarding the effects of the present invention, this liquid coating apparatus and its maintenance method are proposed in which sedimentation and aggregation of the particles dispersed in the liquid are prevented, as well as the malfunction of jetting the liquid and the change of density are prevented, so that the liquid is stably and precisely ejected from the head.

What is claimed is:

1. A liquid coating apparatus for use with a liquid in which plural particles are dispersed, comprising:
   a head which comprises:
      plural nozzles;
      plural pressuring chambers;
      plural piezo elements with electrodes; and
      a common liquid chamber;
      wherein the plural nozzles eject the liquid, and a diameter of each nozzle is 5-8 times of the diameter of the plural particles;
      each pressuring chamber communicates to each nozzle;
      each piezo element is provided on each pressuring chamber to change a volume of the pressuring chamber, and
      the common liquid chamber communicates to each of the plural pressuring chambers;
   a sub-tank which stores the liquid and has an acceleration device to accelerate the plural particles to disperse in the liquid;
   a first flow channel which connects the common liquid chamber with the sub-tank;
   a second flow channel which connects the common liquid chamber with the sub-tank;
   a circulation device which circulates the liquid through a circulation flow channel which includes the common liquid chamber, the first flow channel, the sub-tank and the second flow channel; and
   a control section including a driving signal generating section which has circuits to generate ejection pulses and the control section is configured to sweep the driving frequencies of the micro-vibration pulses; wherein the driving frequencies of the micro-vibration pulses are swept between 1000 Hz to 1/(AL) Hz;
   wherein AL represents an acoustic length being one half of an acoustic resonance frequency of the plural pressuring chambers;
   wherein the driving signal generating section is connected with the electrodes and the control section controls the circulation device and the driving signal generating section so that the micro-vibration pulses are applied to the electrodes for applying a vibration to the circulating liquid in the common liquid chamber.

2. The liquid coating apparatus of claim 1, wherein the acceleration device includes an ultrasonic wave generating device which applies ultrasonic waves to the particles.

3. The liquid coating apparatus of claim 1, wherein the circulation device includes a liquid delivery device which is provided on at least one of the first flow channel and the second flow channel.

4. The liquid coating apparatus of claim 1, wherein the micro-vibration pulses are generated to be very small and do not allow the nozzles to eject the liquid.

5. The liquid coating apparatus of claim 1, wherein the ejection pulses are applied to the electrodes for applying a vibration to the circulating liquid in the common liquid chamber, when the liquid in the head is purged through the nozzles by a suction.

* * * * *